United States Patent [19]

Noguchi et al.

[11] Patent Number: 5,859,237
[45] Date of Patent: Jan. 12, 1999

[54] PROCESS FOR THE PRODUCTION OF PHTHALOCYANINE PIGMENT

[75] Inventors: Hideko Noguchi; Mikio Hayashi; Masatoshi Momose, all of Tokyo, Japan

[73] Assignee: Toyo Ink Manufacturing Co., Ltd., Tokyo, Japan

[21] Appl. No.: 947,148

[22] Filed: Oct. 8, 1997

Related U.S. Application Data

[63] Continuation-in-part of Ser. No. 638,469, Apr. 26, 1996, abandoned.

[30] Foreign Application Priority Data

Apr. 28, 1995 [JP] Japan ................................. 7-105223

[51] Int. Cl.$^6$ .................................................. C09B 47/06
[52] U.S. Cl. ........................ 540/144; 540/122; 540/139; 540/131; 540/133
[58] Field of Search ................................. 540/122, 131, 540/133, 144

[56] References Cited

U.S. PATENT DOCUMENTS

| | | | |
|---|---|---|---|
| 3,087,935 | 4/1963 | Razavi et al. | 260/314.5 |
| 3,280,142 | 10/1966 | Hopmeier et al. | 260/314.5 |
| 5,296,033 | 3/1994 | Dietz et al. | 106/412 |
| 5,296,034 | 3/1994 | Dietz et al. | 106/412 |
| 5,318,623 | 6/1994 | Azuma et al. | 106/410 |
| 5,428,634 | 6/1995 | Azuma et al. | 106/410 |
| 5,492,563 | 2/1996 | Urban | 106/412 |

FOREIGN PATENT DOCUMENTS

| | | |
|---|---|---|
| 0 571 776 | 12/1993 | European Pat. Off. . |
| 0 574 790 | 12/1993 | European Pat. Off. . |
| 1 280 422 | 5/1962 | France . |

OTHER PUBLICATIONS

Azuma et al., Patent Abstracts of Japan, vol. 017, No. 492 (C–1107), 7 Sep. 1993, JP–A–05 125 289.

Kawasaki Kasei Chemicals Ltd., Chemical Abstracts, vol. 94,I No. 12, 23 Mar. 1981, Columbus, Ohio US Abstract No. 85671h.

*Primary Examiner*—Richard L. Raymond
*Assistant Examiner*—Pavanaram K Sripada
*Attorney, Agent, or Firm*—Wenderoth, Lind & Ponack, L.L.P.

[57] ABSTRACT

A process for the production of a phthalocyanine pigment having a clear color tone, a high tinting strength and a finely milled structure by an efficient and economical process, in which the pigmentation from a phthalocyanine crude can be carried out without removing an aromatic hydrocarbon solvent used in the synthesis of the phthalocyanine crude, the process comprising thes steps of (a) reacting phthalic anhydride or its derivative, urea or its derivative and a catalyst in an organic solvent to synthesize a phthalocyanine crude, (b) wet-milling a slurry of the synthesized phthalocyanine crude in the presence of a milling medium without removing the aromatic hydrocarbon solvent, and (c) removing the organic solvent from the slurry of the milled product, purifying the milled product and drying the milled product with a spray type dryer.

8 Claims, No Drawings

PROCESS FOR THE PRODUCTION OF PHTHALOCYANINE PIGMENT

This application is a continuation-in-part of now abandoned application, Ser. No. 08/638,469, filed Apr. 26, 1996, now abandoned.

FIELD OF THE INVENTION

The present invention relates to a process for the production of phthalocyanine pigments which are industrially used in large quantities owing to excellence in various properties such as weathering resistance, heat resistance and chemical resistance, excellent clearness in color and high tinting strength as compared with other organic pigments.

PRIOR ART OF THE INVENTION

A copper phthalocyanine pigment is the most typical among phthalocyanine pigments, and a copper phthalocyanine pigment will be taken up as an example to discuss the prior art of the invention hereinafter. Among organic pigments, a copper phthalocyanine pigment is excellent in various properties such as weathering resistance, heat resistance and chemical resistance and in clearness in color and has high tinting strength, and it is therefore widely used in large quantities in the fields of coloring material industry.

Generally, a copper phthalocyanine crude is produced by a method in which phthalic anhydride or its derivative, urea or its derivative and copper or a copper compound are allowed to react in the presence of a catalyst in an organic solvent such as alkylbenzene, trichlorobenzene or nitrobenzene under atmospheric pressure or elevated pressure at a temperature between 150° C. and 250° C., preferably between 170° C. and 220° C., for 2 to 15 hours, preferably 3 to 7 hours. However, synthesized phthalocyanine molecules consecutively undergo crystal growth in the solvent to form a coarse acicular crystal having a major diameter of approximately 10 to 20 $\mu$m. The so-formed copper phthalocyanine crude has a small value, or no value, as a colorant pigment for an ink, a coating composition and plastics.

It is therefore required to convert the copper phthalocyanine crude into highly valuable particles in view of color, i.e., a finely milled structure having a diameter of approximately 0.01 to 0.05 $\mu$m (the procedure of forming a finely milled structure will be referred to as "pigmentation" hereinafter). Various methods for the above pigmentation have been hitherto proposed, such as a chemical method in which a copper phthalocyanine crude is dissolved in, or wetted by, an acid such as concentrated sulfuric acid and the mixture is poured into a large amount of water to re-precipitate a copper phthalocyanine (acid paste or acid slurry method) and a physical method in which a copper phthalocyanine crude is mechanically milled with a ball mill or a kneader.

However, the method in which a copper phthalocyanine crude is first synthesized and then formed into a pigment has various problems as follows.

1) The production step is lengthy, and uneconomically the cost of equipment is large.

2) The pigmentation step by a chemical method has problems in that the treatment with sulfuric acid corrodes equipment and that waste acid should be disposed of. The latter is also a big problem in view of environmental protection.

3) The main problems of the pigmentation step by a physical method are that the mechanical milling requires a large amount of power (energy), that the treatment time is long or the productivity is low, that the recovery of milling aids such as sodium chloride requires a large additional cost, and that it is required to treat high-COD waste water.

4) A copper phthalocyanine crude is synthesized in the presence of a lipophilic solvent on one hand, and the pigmentation step uses water or a hydrophilic solvent on the other hand. Therefore, the solvent removal and/or recovery are carried out in each step, which is uneconomical.

5) Generally, a copper phthalocyanine crude in the form of powder, which is obtained by removing the solvent from a slurry of a synthesized copper phthalocyanine crude, purifying the crude and drying the crude, is formed into a pigment. Then, the formed pigment is again purified and dried. The purification steps and the drying steps are carried out twice each, which is poor in economic performance.

For overcoming the above problems, there have been hitherto proposed various one-stage synthesis methods in which the synthesis (reaction) and the pigmentation are concurrently carried out, such as a method ① in which the reaction is carried out under high milling strength (JP-B-45-7662, JP-A-48-38332), a method ② in which the reaction is carried out in the presence of a crystal growth inhibitor (JP-B-52-19216, JP-A-61-203175, JP-A-63-207858), and a method ③ in which phthalic anhydride and urea are allowed to react in a mixed solvent containing an aromatic solvent having a high boiling point and a paraffin-containing or naphthene-containing hydrocarbon solvent and then copper or a copper salt is added to the reaction mixture to constitute the central metal of phthalocyanine.

However, the above methods carry out the synthesis and the pigmentation in one apparatus, and therefore have the following problems. The method ① requires a reactor which can withstand high milling strength, and the quality of the pigment obtained in the methods ② and ③ is inferior to that of the pigment obtained by the conventional two-step method in which the synthesis step and the pigmentation step are separately carried out.

Or, recently a method wherein a pigmentation of a crude pigment is carried out by wet-milling using fine beads having a diameter of 1 mm or less (U.S. Pat. No. 5,296,033) is known. However, by the pigmentation method using the fine beads, a part of β-form phthalocyanine undergoes crystal-transition into α-form phthalocyanine due to its strong impact strength, which requires a subsequent step wherein all phthalocyanine is converted into β-form phthalocyanine. It is therefore not an economical method. Further, there is another method wherein the wet-milling is carried out in an aromatic hydrocarbon solvent, or in the presence of a pigment dispersing agent or a surface-active agent for preventing a transition into α-form crystal at a wet-milling time. However, although the crude pigment has been milled into a pigment having a proper particle level, a crystal-growth always occurs in this method while the solvent is removed, which causes a problem that the so-obtained pigment has a small value as a pigment. Further, since this crystal-growth is in proportion to the period of time required for the removal of the solvent and is remarkable especially in the aromatic hydrocarbon solvent, the above problem cannot be solved with an ordinary vacuum type dryer or the like.

SUMMARY OF THE INVENTION

It is an object of the present invention to provide a process for the production of a phthalocyanine pigment having a clear color tone, a high tinting strength and a finely milled structure by an efficient and economical process.

It is another object of the present invention to provide a process for the production of a phthalocyanine pigment in which the productivity is improved and it is carry out the purification step and the drying step once each, which steps are carried out twice each in a conventional method, i.e., after the synthesis of a phthalocyanine crude and after the pigmentation.

It is further another object of the present invention to provide a process for the production of a phthalocyanine pigment in which the pigmentation from a phthalocyanine crude can be carried out with a spray type dryer without removing an aromatic hydrocarbon solvent used in the synthesis of the phthalocyanine crude.

According to the present invention, there is provided a process for the production of a phthalocyanine pigment which comprises the following steps (a), (b) and (c), (a) reacting phthalic anhydride or its derivative, urea or its derivative and a catalyst in an aromatic hydrocarbon solvent to synthesize a phthalocyanine crude, (b) wet-milling a slurry of the synthesized phthalocyanine crude in the presence of a milling medium without removing the aromatic hydrocarbon solvent, and (c) removing the aromatic hydrocarbon solvent from the slurry of the milled product, purifying the milled product and drying the milled product with a spray type dryer.

DETAILED DESCRIPTION OF THE INVENTION

Examples of the phthalic anhydride or the derivative thereof, used in the present invention, include phthalic acid, salts or esters thereof; phthalic anhydride, phthalimide, phthalamic acid and salts or esters of these; and phthalonitrile The phthalic anhydride or the derivative thereof may contain chlorine, bromine, alkyl, phenyl, a sulfone group or carboxyl on its benzene ring.

Examples of the urea or the derivative thereof, used in the present invention, include biuret and ammonia. The amount of the urea or the derivative thereof per 4 mol of the phthalic anhydride or the derivative thereof is approximately 4 to 40 mol.

Examples of the catalyst used in the present invention include molybdenum compounds such as ammonium molybdate, molybdenum oxide and phosphormolybdic acid, titanium compounds such as titanium tetrachloride and titanate ester, zirconium compounds such as zirconium oxide and zirconium carbonate, antimony oxide, arsenic oxide and boric acid.

Examples of the aromatic hydrocarbon solvent used in the present invention include aromatic hydrocarbons such as alkylbenzene, alkylnaphthalene and tetralin. The aromatic hydrocarbon solvent used in the step (a) is 0.5 to 2 times as large as the weight of a phthalocyanine to be synthesized. In addition to the organic solvent used in the step (a), an organic solvent may be added in the step (b) of wet-milling as required. The latter organic solvent is preferably the same as the organic solvent used in the step (a) since it is industrially advantageous in view of the removal and recovery of the organic solvent.

The temperature employed for the synthesis of a phthalocyanine crude is preferably 150° C. to 250° C.

Although not specially limited, the pressure employed for the synthesis of a phthalocyanine crude is preferably an elevated pressure. An elevated pressure serves to prevent the pyrolysis of urea and its derivative and to inhibit a side reaction so that the end product is improved in quality.

In the present invention, further, the step (a) of synthesizing a phthalocyanine crude may be carried out in the presence of a metal which can constitute central metal of the phthalocyanine or a compound of the metal. Examples of the above metal or metal compound include metals such as copper, titanium, vanadium, chromium, manganese, cobalt, iron, nickel and zinc, and halides, hydroxides, oxides, cyanides, phosphates, sulfides, nitrates, sulfates, acetates and carbonates of these metals. The amount of the above metal or metal compound per 4 mol of the phthalic anhydride or its derivative is approximately 0.8 to 1.3 mol.

The above metal which can constitute the central metal can be selected from various metals and metal compounds as described above, while copper phthalocyanine of which the central metal is copper is clear in color and the most widely industrially used.

In the present invention, preferably, any one of phthalocyanine derivatives of the following general formulae (1) to (3) is added when a phthalocyanine crude is synthesized in the step (a) or when the phthalocyanine crude is wet-milled in the step (b). When the phthalocyanine derivative is added, the phthalocyanine pigment as an end product is clear in color and has a high tinting strength as compared with a phthalocyanine pigment obtained without the above phthalocyanine derivative. It is assumed that the phthalocyanine derivative has a particles-controlling effect that it inhibits the growth of particles at the synthesis time or wet-milling time.

$$MePc(SO_3^{-+NR^1R^2R^3R^4})_n \quad (1)$$

wherein MePC is a metal-free or metal-containing phthalocyanine residue on which a halogen atom may be substituted, each of $R^1$, $R^2$, $R^3$ and $R^4$ is independently an alkyl group, a substituted alkyl group, an aryl group, a substituted aryl group, or a polyoxyalkylene group, and n is an integer of from 1 to 4.

$$MePc[X—Y—Z—N(R^5)R^6]_k \quad (2)$$

wherein MePc is as defined above, X is a direct bond or a divalent binding group of a chemically rational combination consisting of 2 to 15 atoms selected from S, C, N, O and H atoms, Y is a direct bond, a —N($R^7$)— in which $R^7$ is an alkyl group having 1 to 18 carbon atoms or Z—N($R^5$)$R^6$, or —O—, Z is an alkylene group having 1 to 6 carbon atoms, each of $R^5$ and $R^6$ is independently an alkyl group having 1 to 18 carbon atoms or a substituted alkyl group having 1 to 18 carbon atoms, or a combination of $R^5$ and $R^6$ is a heterocyclic ring which may contain N, O or S and which may have a substituent and k is an integer of from 1 to 3.

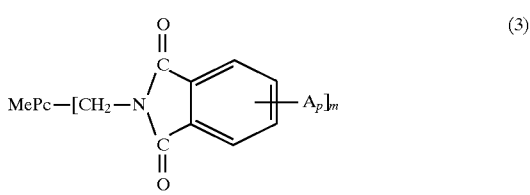

(3)

wherein MePc is as defined above, A is a halogen atom or a nitro, amino, sulfone, carboxyl or alkyl group, p is an integer of 0 to 4 and m is an integer of 1 to 4.

The compound of the general formula (1) is obtained by reacting phthalocyaninesulfonic acid with an amine component. The amine component is not specially limited, and can be selected from primary amines, secondary amines, tertiary amines and quaternary ammonium salts. These amines and ammonium salts are disclosed, for example, in Japanese Patent Publications Nos. 39-28884 and 40-4143, JP-A-52-

33922, JP-A-57-12067 and JP-A-3-33166. Specific examples of the amine component are as follows. Examples of the primary amines include amines such as hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine and eicosylamine, and unsaturated amines having carbon atoms equivalent to the number of carbon atoms of the above amines. These amines may have a branch. The secondary and tertiary and the quaternary ammonium salts are formed of an alkyl or aryl group constituting the above primary amine and at least one of methyl, ethyl, propyl, butyl, pentyl or the like.

Examples of the secondary and tertiary amines and the quaternary ammonium salts include dioleylamine, distearylamine, dimethyloctylamine, dimethyldecylamine, dimethyllaurylamine, dimethylstearylamine, dilaurylmonomethylamine, trioctylamine, dimethyldidodecylammonium chloride, dimethyldioleylammonium chloride, dimethyldidecylammonium chloride, dimethyldioctylammonium chloride, trimethylstearylammonium chloride, dimethyldistearylammonium chloride, trimethyldodecylammonium chloride, triemthylhexadecylammonium chloride, trimethyloctadecylammonium chloride, dimethyldodecylammonium chloride, and dimethylhexadecyloctadecylammonium chloride.

Further, the compound of the general formula (1) in which one or some of $R^1$, $R^2$, $R^3$ and $R^4$ is/are alkyl group, substituted alkyl group, aryl group or substituted aryl group, is obtained by reacting phthalocyaninesulfonic acid with an amine component which may contain a substituent. The substituent may form a heterocyclic ring. The substituent includes a primary amino group, a secondary amino group, a tertiary amino group, halogen, hydroxyl, carbonyl, carboxyl, ether, ester and acyl. Examples of the amine component containing an amino group as a substituent include diamine, triamine, tetramine, pentamine and hexamine.

When one or some of $R^1$, $R^2$, $R^3$ and $R^4$ is/are polyoxyalkylene group, examples of the polyoxyalkylene group include polyoxyethylene and polyoxypropylene.

The method of preparing the compound of the general formula (1) used in the present invention is not specially limited. Generally, it can be prepared by a method in which a phthalocyanine pigment is sulfonated by a conventional method and then reacted with an amine in the presence or absence of water or an organic solvent.

Specific examples of the phthalocyanine derivative of the general formula (1) are as follows.

TABLE 1

| No. | Structure |
|---|---|
| | CuPc—[$SO_3^-{}^+NH_3(C_8H_{17})$]$_4$ |
| | $(Cl)_2$—CuPc—$SO_3^-{}^+NH_3(C_8H_{17})$] |
| | CuPc—[$SO_3^-{}^+NH_3(C_{12}H_{28})$]$_3$ |
| | $(Cl)_{12}$—CuPc—$SO_3^-{}^+NH_3(C_{12}H_{25})$) |
| | $(Cl)_4(Br)_2$—CuPc—[$SO_3^-{}^+NH_3(C_{12}H_{25})$]$_3$ |
| | CuPc—$SO_3^-{}^+NH_3(C_{17}H_{35})$ |
| | CuPc—[$SO_3^-{}^+NH_2(C_{10}H_{21})_2$]$_2$ |
| G | NiPc—$SO_3^-{}^+NH(CH_3)_2(C_{18}H_{37})_2$ |
| | $(Cl)_5(Br)_5$—CuPc—$SO_3^-{}^+NH_2(C_{17}H_{35})_2$ |
| D | CuPc—$SO_3^-{}^+NH(CH_3)_2(C_{18}H_{37})_2$ |

TABLE 1-continued

| No. | Structure |
|---|---|
| A | CuPc—[$SO_3^-{}^+N(CH_3)_3(C_{12}H_{25})$]$_2$ |
| | CuPc—$SO_3^-{}^+N(CH_3)_2(C_{18}H_{37})_2$ |
| | CuPc—$SO_3^-{}^+N(CH_3)(C_2H_5)_2[(CH_2CH(CH_3)O)_{25}H]$ |

CuPc—$SO_3^-{}^+N(C_{18}H_{37})(CH_3)_2CH_2$

Notes: CuPc = copper phthalocyanine residue, NiPc = nickel phthalocyanine residue, G, D, A = compounds G, D and A used in Examples In the general formula (2), X is a direct bond or a divalent binding group of a chemically rational combination consisting of 2 to 15 atoms selected from S, C, N, O and H atoms. Examples of the binding group include —$SO_2$—, —CO—, —$CH_2$—, —O—, —COO—, —NH— and combinations of these. The binding group is preferably —$SO_2$—, —CO—, —$CH_2$— or —$CH_2NHCOCH_2$—. When each of $R^5$ and $R^6$ in the general formula (2) is independently an alkyl group, the alkyl group preferably includes lower alkyl groups such as methyl, ethyl, propyl and butyl. The alkyl group may have up to 18 carbon atoms, and the alkyl group having up to 18 carbon atoms may be branched. The alkyl group may have a substituent so long as the number of carbon atoms does not exceed 18. Further, $R^5$ and $R^6$ may be combined while forming a five-membered or six-membered ring containing N, O or S.

Specific examples of the phthalocyanine derivative of the general formula (2) are as follows.

TABLE 2

| No. | Structure |
|---|---|
| C | CuPc—[$SO_2NH(CH_2)N(CH_3)_2$]$_{1.5}$ |
| | CuPC—[$CH_2NHCH_2N(C_4H_9)_2$]$_3$ |
| F | CuPc—$CH_2NHCOCH_2NH(CH_2)_3N(C_4H_9)_2$ |
| | CuPc—$CONH(CH_2)_3N(C_3H_7)_2$ |
| | CuPc—$CH_2N[(CH_2)_3CH_3]_2$ |

CuPc—[$CH_2NHCOCH_2NH(CH_2)_3N$⟨hexagonal ring⟩]$_2$ $(Cl)_{10}$—CuPc—$SO_2NH(CH_2)_2N$⟨morpholine ring with O⟩

CuPc—[$CH_2N(C_2H_5)_2$]$_2$
$(Cl)_2$—CuPc—$CH_2N(C_{18}H_{37})_2$
$(Cl)_6(Br)_2$—CuPc—$CONH(CH_2)_2N(C_3H_7)_2$
CuPc—$NH(CH_2)_2N(C_3H_7)_2$

Notes: CuPc = copper phthalocyanine, C, F = compounds C and F used in Examples.

The compound of the general formula (3) in the present invention may be a compound in which halogen atom, nitro group, amino group, sulfo group, carboxyl group or alkyl group is substituted on any position on the benzene ring of the phthalimide methyl group.

Specific examples of the phthalocyanine derivative of the general formula (3) are as follows.

TABLE 3

| No. | Structure |
|-----|-----------|
| B | CuPc—CH$_2$—N(C=O)(C=O)—C$_6$H$_4$ |
| | CuPc—[CH$_2$—N(C=O)(C=O)—C$_6$H$_3$(NO$_2$)]$_4$ |
| E | CuPc—[CH$_2$—N(C=O)(C=O)—C$_6$H$_3$(Cl)]$_2$ |

Notes: CuPc = copper phthalocyanine, B, E = compounds B and E used in Examples

The phthalocyanine derivative of any one of the general formulae (1), (2) and (3) in a powder state, or a solution or dispersion of the phthalocyanine derivative in an organic solvent may be added after the synthesis of the phthalocyanine crude in the step (a) (then the mixture is stirred) or when the synthesized phthalocyanine crude is wet-milled in the step (b). In any case, the phthalocyanine derivative is adsorbed on the pigment surface by the stirring or during the wet-milling. The phthalocyanine derivative remains as a component of the pigment (pigment composition).

The amount of the phthalocyanine derivative per 100 parts by weight of the synthesized phthalocyanine is preferably 0.1 to 10 parts by weight.

The apparatus used for wet-milling in the presence of a milling medium is selected from a vibration mill, an attritor, a horizontal sand mill and a vertical sand mill.

The milling medium used in the present invention is selected from metal beads, glass beads and ceramic beads. Zircoia beads are the most preferred in view of wear resistance and crush resistance.

In the present invention, the crushing strength and milling strength of the milling medium increase with a decrease in the diameter thereof. However, the milling medium having a small diameter is disadvantageous in view of separating the milling medium from the slurry after the wet-milling. The diameter of the milling medium is 1 mm or less, preferably 0.1 to 0.3 mm.

The wet-milling under pressure utilizes the crushing strength and milling strength caused by collision of the fine beads in the presence of the organic solvent. For obtaining a pigment having an excellent product quality, the amount of the organic solvent in the wet-milling is preferably 2 to 20 times, particularly preferably 4 to 12 times, as large as the amount of the phthalocyanine. When the amount of the organic solvent is greater than the above upper limit, the slurry has too low a viscosity. When the amount of the organic solvent is smaller than the above lower limit, the slurry has too high a viscosity. In these cases, undesirably, the milling efficiency is low.

Further, when the fine milling medium having a diameter of 1 mm or less, or 0.1 to 0.3 mm, is used for the wet-milling from the beginning, coarse particles of phthalocyanine crude may remain in some cases. The following steps are therefore preferred. First, the coarse particles of phthalocyanine crude is preliminarily roughly milled with a milling medium having a diameter of more than 1 mm, preferably 1 mm to 3 mm, next, the phthalocyanine crude is wet-milled in the presence of a milling medium having a diameter of 1 mm or less, preferably 0.6 to 0.8 mm, for the second step, and lastly, the phthalocyanine crude is wet-milled in the presence of the fine milling medium having a diameter of 0.1 to 0.3 mm. The period of time required for the above roughly milling and the wet-milling of the second step is preferably 10 to 70% of the whole milling time. As described above, when milling mediums having different diameters are used for the wet-milling for several times, preferably three times, the milling efficiency increases.

In the present invention, the temperature at the wet-milling time is important. When the temperature is too high, the phthalocyanine pigment particles undergo crystal growth. When the temperature is too low, they undergo crystal transition. The temperature at the wet-milling time is preferably 50° C. to 90° C.

After the wet-milling, the aromatic hydrocarbon solvent can be removed and recovered by a method using a spray type dryer, and the phthalocyanine pigment obtained by this method has a product quality equivalent to that of the phthalocyanine pigment obtained by the above method in which the organic solvent is replaced with the hydrophilic solvent. The reason therefor is assumed to be as follows. The method using the spray type dryer is a method in which the phthalocyanine pigment forms fine cores (particles) when dried. The heat application at the time of solvent removal is remarkably short, as short as several tens seconds. Further, when the above phthalocyanine derivative is used in combination, the crystal growth is further prevented.

As described above, according to the process of the present invention, a fine phthalocyanine pigment having a hue and a specific surface area equivalent to those of a pigment can be obtained by removing and recovering the solvent with a spray type dryer after forming the synthesized phthalocyanine crude into a pigment without removing the solvent from a slurry of the synthesized phthalocyanine crude. The process of the present invention is therefore remarkably simple, efficient and economical as compared with a conventional process of synthesizing a phthalocyanine crude and forming the phthalocyanine crude into a pigment through complicated steps requiring a long period of time and a large amount of power. Further, it becomes possible to recover the phthalocyanine pigment from the aromatic hydrocarbon solvent with little crystal-growth, which has been very difficult in the conventional process.

The fine copper phthalocyanine pigment obtained in the present invention can be used for producing a coating composition, an ink or a colorant for a plastic by dispersing it in a proper medium such as a resin, a varnish or a plastic.

EXAMPLES

The present invention will be explained more in detail with reference to Examples and Comparative Examples hereinafter, while the present invention shall not be limited thereto. In Examples and Comparative Examples, "part" stands for "part by weight", and "%" stands for "% by weight".

Compound Nos. shown in Examples are the same as those shown in Tables 1 to 3.

Example 1

A 1-liter autoclave was charged with 100 parts of phthalic anhydride, 145 parts of urea, 0.5 part of ammonium molybdate, 17 parts of copper chloride (I) and 200 parts of Hisol P (alkylbenzene, supplied by Nippon Petrochemical Co., Ltd.), and the mixture was heated up to 200° C. under an elevated pressure of 1.5~3.0 kg/cm$^2$G and allowed to react to give a slurry of a copper phthalocyanine crude. Then, the slurry was allowed to cool, and then, 17 parts of the slurry of phthalocyanine crude was charged into a vertical sand mill packed with 400 parts of zirconia beads having a diameter of 0.3 mm. Then, 32 parts of additional Hisol P was added, and the phthalocyanine crude was milled at 80° C. for 2 hours. The resultant milled product and the milling medium were separated through two filters. Hisol P was removed from the so-obtained slurry of the phthalocyanine pigment with a spray type dryer to give a crude pigment. The apparatus of the spray type dryer and its using condition were as follows.

An apparatus name: Mobile Minor Spray Dryer, a spray type dryer supplied by Niro Japan.

A spraying system: centrifugal system, wheel model SL-24-50, 3000 rpm.

A feed quantity: 1.0 l/hr.

A temperature of a drying room entrance: 250° C.

A temperature of a drying room exit: 150° C.

The crude pigment was added to 300 parts of a 1% sodium hydroxide aqueous solution, and the mixture was heated at 80° C. for 30 minutes. Then, the mixture was filtered while fully washing the product with hot water until the pH of the filtrate became neutral. Further, the product was added to 300 parts of a 2% sulfuric acid aqueous solution, and the mixture was stirred under heat at 80° C. for 30 minutes. The mixture was filtered while fully washing the product with hot water until the pH of the filtrate became neutral. Then, the product was dried to give a β-form copper phthalocyanine pigment. The so-obtained pigment was measured and evaluated for a specific surface area, a tinting strength and a color tone. Table 4 shows the results together with the results of measurement and evaluation of products obtained in Examples and Comparative Example to be described later.

The above-obtained copper phthalocyanine pigment was measured for a tinting strength as follows.

An oil ink was prepared from 2 parts of a copper phthalocyanine pigment sample, 8 parts of a rosin-modified resin and 250 parts of a white varnish with hoober Mullor, and the oil ink was measured for a color tone and a tinting strength with a color machine. The tinting strength data in Table 1 are data obtained by relative evaluation when the tinting strength of the copper phthalocyanine pigment obtained in Example 1 was taken as 100.

Comparative Example 1

Without wet-milling the same copper phthalocyanine crude as that obtained in Example 1, Hisol P was directly removed with a spray type dryer. The so-obtained pigment was added to 300 parts of a 1% sodium hydroxide aqueous solution and stirred under heat at 80° C. for 30 minutes. Then, the mixture was filtered while fully washing the product with hot water until the pH of the filtrate became neutral. Further, the resultant mixture was added to 300 parts of a 2% of sulfuric acid aqueous solution and the mixture was stirred under heat at 80° C. for 30 minutes. Then, the mixture was filtered while fully washing the product with hot water until the pH of the filtrate became neutral and the product was dried.

Example 2

A copper phthalocyanine pigment was obtained in the same manner as in Example 1 except that the vertical sand mill was replaced with a horizontal sand mill. The copper phthalocyanine pigment had a high tinting strength.

Example 3

A copper phthalocyanine pigment was obtained in the same manner as in Example 1 except that the copper phthalocyanine crude was, first, roughly wet-milled in the presence of 400 parts of zirconia beads having a diameter of 1.2 mm for 30 minutes, next, wet-milled in the presence of 400 parts of zirconia beads having a diameter of 0.8 mm for 40 minutes, and further wet-milled in the presence of 400 parts of zirconia beads having a diameter of 0.3 mm for 30 minutes in place of the wet-milling in the presence of 400 parts of zirconia beads having a diameter of 0.3 mm. The so-obtained copper phthalocyanine pigment was clearer in color than the pigment obtained in Example 1.

Example 4

A 1-liter autoclave was charged with 100 parts of phthalic anhydride, 145 parts of urea, 0.5 part of ammonium molybdate, 17 parts of copper chloride (I) and 170 parts of Hisol P (alkylbenzene, supplied by Nippon Petrochemical Co., Ltd.), and the mixture was heated up to 200° C. under an elevated pressure of 1.5~3.0 kg/cm$^2$G and allowed to react to give a slurry of a copper phthalocyanine crude. Then, the slurry was allowed to cool, and then, the compound A (shown in Table 1) was added to 17 parts of the slurry of copper phthalocyanine crude. The amount of the compound A was 4% based on the copper phthalocyanine crude. The mixture was charged into a vertical sand mill packed with 400 parts of zirconia beads having a diameter of 0.3 mm. Then, 32 parts of additional Hisol P was added, and the phthalocyanine crude was milled at 80° C. for 2 hours. The resultant milled product and the milling medium were separated through two filters. Hisol P was removed from the so-obtained slurry of the phthalocyanine pigment with a spray type dryer to give a crude pigment. The apparatus of the spray type dryer and its using condition were as follows.

An apparatus name: Mobile Minor Spray Dryer, a spray type dryer supplied by Niro Japan.

A spraying system: centrifugal system, wheel model SL-24-50, 3000 rpm.

A feed quantity: 1.0 l/hr.

A temperature of a drying room entrance: 250° C.

A temperature of a drying room exit: 150° C.

The crude pigment was added to 300 parts of a 1% sodium hydroxide aqueous solution, and the mixture was heated at 80° C. for 30 minutes. Then, the mixture was filtered while fully washing the product with hot water until the pH of the filtrate became neutral. Further, the product was added to 300 parts of a 2% sulfuric acid aqueous solution, and the mixture was stirred under heat at 80° C. for 30 minutes. The mixture was filtered while fully washing the product with hot water until the pH of the filtrate became neutral. Then, the product was dried to give a copper phthalocyanine pigment. The so-obtained pigment had a clearer color and a higher tinting strength than the pigment obtained in Example 1.

Example 5

A copper phthalocyanine pigment was obtained in the same manner as in Example 4 except that the compound A was replaced with the compound B (shown in Table 3). The so-obtained pigment had a clearer color and a higher tinting strength than the pigment obtained in Example 1.

Example 6

A copper phthalocyanine pigment was obtained in the same manner as in Example 4 except that the compound A was replaced with the compound C (shown in Table 2). The so-obtained pigment had a clearer color and a higher tinting strength than the pigment obtained in Example 1.

Comparative Example 2

A copper phthalocyanine pigment was obtained in the same manner as in the Example 4 except that Hisol P was removed from the same slurry of the phthalocyanine pigment as that obtained in Example 4 with a vacuum dryer in place of the spray type dryer. The so-obtained copper phthalocyanine pigment had a little tinting strength and didn't have sufficient properties as a pigment.

Comparative Example 3

A copper phthalocyanine pigment was obtained in the same manner as in the Example 4 except that Hisol P was removed from the same slurry of the phthalocyanine pigment as that obtained in Example 4 with a thin film evaporation type dryer(Hi-evaolator, supplied by Sakuraseisakusyo) in place of the spray type dryer. The so-obtained copper phthalocyanine pigment had a little tinting strength and didn't have sufficient properties as a pigment.

Comparative Example 4

A copper phthalocyanine pigment was obtained in the same manner as in the Example 4 except that Hisol P was removed from the same slurry of the phthalocyanine pigment as that obtained in Example 4 with Crux(supplied by Hosokawa Micron) in place of the spray type dryer. The so-obtained copper phthalocyanine pigment had a little tinting strength and didn't have sufficient properties as a pigment.

Example 7

A copper phthalocyanine pigment was obtained in the same manner as in Example 4 except that the compound D (shown in Table 1) was added to 17 parts of the slurry of the synthesized copper phthalocyanine crude. The so-obtained copper phthalocyanine pigment had a clear color and a high tinting stregnth.

Example 8

A copper phthalocyanine pigment was obtained in the same manner as in Example 4 except that the compound E (shown in Table 3) was added to 17 parts of the slurry of the synthesized copper phthalocyanine crude. The so-obtained copper phthalocyanine pigment had a clear color and a high tinting stregnth.

Example 9

A copper phthalocyanine pigment was obtained in the same manner as in Example 4 except that the compound F (shown in Table 2) was added to 17 parts of the slurry of the synthesized copper phthalocyanine crude. The so-obtained copper phthalocyanine pigment had a clear color and a high tinting strength.

Example 10

A 1-liter autoclave was charged with 100 parts of phthalic anhydride, 145 parts of urea, 0.5 part of ammonium molybdate, 22 parts of nickel chloride and 200 parts of Hisol P (alkylbenzene, supplied by Nippon Petrochemical Co., Ltd.), and the mixture was heated up to 200° C. under an elevated pressure of 1.5~3.0 kg/cm$^2$G and allowed to react to give a slurry of a nickel phthalocyanine crude. Then, the slurry was allowed to cool, and then, 17 parts of the slurry of nickel phthalocyanine crude was charged into a vertical sand mill packed with 400 parts of zirconia beads having a diameter of 0.3 mm. Then, 32 parts of additional Hisol P was added, and the phthalocyanine crude was milled at 80° C. for 2 hours. The resultant milled product and the milling medium were separated through two filters. Hisol P was removed from the so-obtained slurry of the phthalocyanine pigment with a spray type dryer to give a crude pigment. The apparatus of the spray type dryer and its using condition were as follows.

- An apparatus name: Mobile Minor Spray Dryer, a spray type dryer supplied by Niro Japan.
- A spraying system: centrifugal system, wheel model SL-24-50, 3000 rpm.
- A feed quantity: 1.0 l/hr.
- A temperature of a drying room entrance: 250° C.
- A temperature of a drying room exit: 150° C.

The crude pigment was added to 300 parts of a 1% sodium hydroxide aqueous solution, and the mixture was heated at 80° C. for 30 minutes. Then, the mixture was filtered while fully washing the product with hot water until the pH of the filtrate became neutral. Further, the product was added to 300 parts of a 2% sulfuric acid aqueous solution, and the mixture was stirred under heat at 80° C. for 30 minutes. The mixture was filtered while fully washing the product with hot water until the pH of the filtrate became neutral. Then, the product was dried to give a nickel phthalocyanine pigment. The so-obtained pigment was measured and evaluated for a specific surface area, a tinting strength and a color tone. Table 4 shows the results together with the results of measurement and evaluation of products obtained in Examples and Comparative Example to be described later.

The above-obtained nickel phthalocyanine pigment was measured for tinting strength in the same manner as in Example 1. The tinting strength data in Table 5 are data obtained by relative evaluation when the tinting strength of the nickel phthalocyanine pigment obtained in Example 11 was taken as 100.

Comparative Example 5

Without wet-milling the same nickel phthalocyanine crude as that obtained in Example 10, Hisol P was directly removed with a spray type dryer. Then, the so-obtained pigment was added to 300 parts of a 1% sodium hydroxide aqueous solution and stirred under heat at 80° C. for 30 minutes. Then, the mixture was filtered while fully washing the product with hot water until the pH of the filtrate became neutral. Further, the resultant mixture was added to 300 parts of a 2% of sulfuric acid aqueous solution and the mixture was stirred under heat at 80° C. for 30 minutes. Then, the mixture was filtered while fully washing the product with hot water until the pH of the filtrate became neutral and the product was dried.

Example 11

A 1-liter autoclave was charged with 100 parts of phthalic anhydride, 145 parts of urea, 0.5 part of ammonium molybdate, 17 parts of nickel chloride and 170 parts of Hisol P, and the mixture was heated up to 200° C. under an elevated pressure of 1.5~3.0 kg/cm²G and allowed to react to give a slurry of a nickel phthalocyanine crude. Then, the slurry was allowed to cool, and then, the compound G was added to 17 parts of the slurry of copper phthalocyanine crude. The amount of the compound G was 4% based on the nickel phthalocyanine crude. The mixture was charged into a vertical sand mill packed with 400 parts of zirconia beads having a diameter of 0.3 mm. Then, 32 parts of additional Hisol P was added, and the phthalocyanine crude was milled at 80° C. for 2 hours. The resultant milled product and the milling medium were separated through two filters while washing them with methanol. The resultant cake was added to 300 parts of a 1% sodium hydroxide aqueous solution, and the mixture was stirred under heat at 80° C. for 30 minutes. Then, the mixture was filtered while fully washing the product with hot water until the pH of the filtrate became neutral. Further, the product was added to 300 parts of a 2% sulfuric acid aqueous solution, and the mixture was stirred under heat at 80° C. for 30 minutes. The mixture was filtered while fully washing the product with hot water until the pH of the filtrate became neutral. Then, the product was dried to give a nickel phthalocyanine pigment. The so-obtained pigment had a clearer color and a higher tinting strength than the pigment obtained in Example 10.

TABLE 4

| Example | Specific surface area (m²/g) | Color tone (Clearness in color) | Tinting strength (%) |
|---|---|---|---|
| Ex. 1 | 55 | — | 100 |
| CEx. 1 | 8 | Poor | 25 |
| Ex. 2 | 53 | Equivalent | 99 |
| Ex. 3 | 58 | A littler Clearer | 103 |
| Ex. 4 | 67 | Clearer | 102 |
| Ex. 5 | 69 | Clearer | 105 |
| Ex. 6 | 77 | Remarkably clear | 110 |
| CEx. 2 | 55 | A littler poor | 88 |
| Cex. 3 | 57 | A littler poor | 90 |
| CEx. 4 | 58 | A littler poor | 91 |
| Ex. 7 | 66 | Clearer | 101 |
| Ex. 8 | 68 | Clearer | 104 |
| Ex. 9 | 76 | Clearer | 109 |

Ex. = Example, CEx. = Comparative Example

TABLE 5

| Example | Specific surface area (m²/g) | Color tone (Clearness in color) | Tinting strength (%) |
|---|---|---|---|
| Ex. 10 | 54 | — | 100 |
| CEx. 5 | 10 | Poor | 23 |
| Ex. 11 | 66 | Clearer | 103 |

Ex. = Example, CEx. = Comparative Example

According to the process of the present invention, a fine phthalocyanine pigment having an excellent hue and a large specific surface area can be obtained by removing and recovering the solvent with a spray type dryer after forming the synthesized phthalocyanine crude into a pigment without removing the solvent from a slurry of the synthesized phthalocyanine crude. The process of the present invention is therefore remarkably simple, efficient and economical as compared with a conventional process of synthesizing a phthalocyanine crude and forming the phthalocyanine crude into a pigment through complicated steps requiring a long period of time and a large amount of power.

The present invention can overcome the following problems of conventional methods.

(1) The organic solvent used for synthesizing a phthalocyanine crude is also used in the step of pigmentation, so that it is sufficient to remove and recover the organic solvent only once. The phthalocyanine pigment cannot have been recovered as a pigment after the direct pigmentation from a synthesized slurry of a phthalocyanine crude in the conventional method, since phthalocyanine molecules always undergoes a crystal-growth in the aromatic hydrocarbon solvent while the solvent is removed. However, it becomes possible by using a spray type dryer.

(2) The pigmentation is carried out in a slurry of a synthesized phthalocyanine crude, so that it is sufficient to carry out the purification and the drying once each, which steps are carried out twice each in a conventional method, i.e., after the synthesis of a phthalocyanine crude and after the pigmentation.

What is claimed is:

1. A process for the production of a phthalocyanine pigment which comprises the following steps (a), (b) and (c), (a) reacting phthalic anhydride or its derivative, urea or its derivative and a catalyst in an aromatic hydrocarbon solvent to synthesize a phthalocyanine crude, (b) wet-milling a slurry of the synthesized phthalocyanine crude in the presence of a particulate milling medium having a diameter of 0.1 to 0.3 mm without removing the aromatic hydrocarbon solvent, and (c) removing the aromatic hydrocarbon solvent from the slurry of the milled product, purifying the milled product and drying the milled product with a spray type dryer, wherein at least one phthalocyanine derivative of the following formulae (1) to (3) is added after the phthalocyanine crude is synthesized in step (a) or when the phthalocyanine crude is wet-milled in step (b),

$$MePc(SO_1^{-+}NR^1R^2R^3R^4)_n \quad (1)$$

wherein MePc is a metal-free or metal-containing phthalocyanine residue on which a halogen atom may be substituted, each of $R^1$, $R^2$, $R^3$ and $R^4$ is independently an alkyl group, a substituted alkyl group, an aryl group, a substituted aryl group, or a polyoxyalkylene group, and n is an integer of from 1 to 4,

$$MePc[X—Y—Z—N(R^5)R^6]_k \quad (2)$$

wherein MePc is as defined above, X is a direct bond or a divalent binding group of a chemically rational combination consisting of 2 to 15 atoms selected from S, C, N, O and H atoms, Y is a direct bond, a —N($R^7$)— in which $R^7$ is an alkyl group having 1 to 18 carbon atoms or Z—N($R^5$)$R^6$, or —O—, Z is an alkylene group having 1 to 6 carbon atoms, each of $R^5$ and $R^6$ is independently an alkyl group having 1 to 18 carbon atoms or a substituted alkyl group having 1 to 18 carbon atoms, or $R^5$ and $R^6$ together with the nitrogen atom to which they are attached form a 5- or 6-membered heterocyclic ring which may contain N, O or S and which may have a substituent, and k is an integer of from 1 to 3,

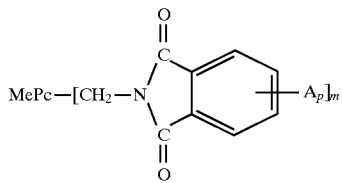

(3)

wherein MePc is as defined above, A is a halogen atom or a nitro, amino, sulfone, carboxyl or alkyl group, p is an integer of 0 to 4 and m is an integer of 1 to 4.

2. A process according to claim 1, wherein the step (a) of synthesizing a phthalocyanine crude is carried out in the presence of a metal which can constitute central metal of the phthalocyanine or a compound of the metal.

3. A process according to claim 1, wherein the phthalocyanine derivative is added in an amount of 0.1 to 10 parts by weight per 100 parts by weight of the phthalocyanine.

4. A process according to claim 1, wherein the slurry of the phthalocyanine crude is wet-milled in the presence of an additional aromatic hydrocarbon solvent.

5. A process according to claim 1, wherein the slurry of the phthalocyanine crude is wet-milled in the presence of the aromatic hydrocarbon solvent of which the amount is 2 to 20 times as large as the weight of the phthalocyanine.

6. A process according to claim 1, wherein the wet-milling is carried out with a wet-milling apparatus selected from the group consisting of a vibration mill, an attritor and a sand mill.

7. A process according to claim 1, wherein the wet-milling is carried out by milling the phthalocyanine crude in the presence of a particulate milling medium having a diameter of over 1 mm in advance and then milling the phthalocyanine crude in the presence of a particulate milling medium having a diameter of 0.1 to 0.3 mm.

8. A process according to claim 1, wherein the wet-milling is carried out in a temperature range of from 50° C. to 90° C.

* * * * *

UNITED STATES PATENT AND TRADEMARK OFFICE
CERTIFICATE OF CORRECTION

PATENT NO. : 5,859,237
DATED : January 12, 1999
INVENTOR(S) : HIDEKO NOGUCHI, MIKIO HAYASHI, MASATOSHI MOMOSE

It is certified that error appears in the above-identified patent and that said Letters Patent is hereby corrected as shown below:

On the title page, left hand column, the first named inventor should read "Hideto Noguchi".

Column 4, line 29, correct the formula to read

-- $MePc(SO_3^{-+}NR^1R^2R^3R^4)_n$ --.

Signed and Sealed this

Twenty-eighth Day of September, 1999

Attest:

Q. TODD DICKINSON

*Attesting Officer*  *Acting Commissioner of Patents and Trademarks*